(12) United States Patent
Glowacki et al.

(10) Patent No.: US 7,836,071 B2
(45) Date of Patent: Nov. 16, 2010

(54) DISPLAYING RELEVANT ABSTRACT DATABASE ELEMENTS

(75) Inventors: Janice R. Glowacki, Rochester, MN (US); Richard D. Dettinger, Rochester, MN (US); Fred A. Kulack, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 11/856,923

(22) Filed: Sep. 18, 2007

(65) Prior Publication Data

US 2009/0077012 A1    Mar. 19, 2009

(51) Int. Cl.
*G06F 17/30* (2006.01)
(52) U.S. Cl. .............................. 707/769; 707/999.003; 707/E17.014; 707/E17.062

(58) Field of Classification Search .................. 707/609, 707/718, 769, 791, 999.003, E17.014, E17.062
See application file for complete search history.

(56) References Cited

U.S. PATENT DOCUMENTS

| 6,996,558 | B2 | 2/2006 | Dettinger et al. |
| 7,054,877 | B2 * | 5/2006 | Dettinger et al. ............ 707/101 |
| 7,089,235 | B2 | 8/2006 | Dettinger et al. |
| 7,461,052 | B2 | 12/2008 | Dettinger et al. |

* cited by examiner

*Primary Examiner*—Fred I Ehichioya
(74) *Attorney, Agent, or Firm*—Patterson & Sheridan, LLP (57) ABSTRACT

Embodiments of the invention enable users of an abstract database to use logical fields that are relevant to a given model entity. In one embodiment, a user may be presented with a query interface that includes relevant fields, and which may be used to compose abstract queries. In another embodiment, the query interface may include an initial query result, and may include relevant fields for model entities included in the initial query result. The query interface may be configured to enable a user to perform subsequent query operations using the included relevant fields.

21 Claims, 9 Drawing Sheets

| | |
|---|---|
| DATABASE ABSTRACTION MODEL | ~148 |
| LOGICAL FIELDS | ~208 |
| MODEL ENTITIES | ~225 |
| RELEVANT FIELDS | |
| Patient:<br>   FirstName<br>   LastName<br>   Birthdate<br>   Age | 229 |

DISPLAYING RELEVANT ABSTRACT DATABASE ELEMENTS

BACKGROUND OF THE INVENTION

The invention generally relates to computer database systems. More particularly, the invention relates to techniques for displaying relevant abstract database elements in a query interface.

DESCRIPTION OF THE RELATED ART

Databases are well known systems for storing, searching, and retrieving information stored in a computer. A particularly common type of database is the relational database, which stores data using a set of tables that may be reorganized and accessed in a number of different ways. Users access information in relational databases using a relational database management system (DBMS).

Each table in a relational database includes a set of one or more columns. Each column typically specifies a name and a data type (e.g., integer, float, string, etc.), and may be used to store a common element of data. For example, in a table storing data about patients treated at a hospital, each patient might be referenced using a patient identification number stored in a "patient ID" column. Reading across the rows of such a table would provide data about a particular patient. Tables that share at least one attribute in common are said to be "related." Further, tables without a common attribute may be related through other tables that do share common attributes. A path between two tables is often referred to as a "join," and columns from tables related through a join may be combined to from a new table returned as a set of query results.

Queries of a relational database may specify which columns to retrieve data from, how to join the columns together, and conditions (predicates) that must be satisfied for a particular data item to be included in a query result table. Current relational databases require that queries be composed in complex query languages. Today, the most widely used query language is Structured Query Language (SQL). However, other query languages are also used. An SQL query is composed from one or more clauses set off by a keyword. Well-known SQL keywords include the SELECT, WHERE, FROM, HAVING, ORDER BY, and GROUP BY keywords. Composing a proper SQL query requires that a user understand both the structure and content of the relational database as well as the complex syntax of the SQL query language (or other query language). The complexity of constructing an SQL statement, however, generally makes it difficult for average users to compose queries of a relational database.

Because of this complexity, users often turn to database query applications to assist them in composing queries of a database. One technique for managing the complexity of a relational database, and the SQL query language, is to use database abstraction techniques. Commonly assigned U.S. patent application Ser. No. 10/083,075 (the '075 application) entitled "Application Portability and Extensibility through Database Schema and Query Abstraction," discloses techniques for constructing a database abstraction model over an underlying physical database.

The '075 application discloses embodiments of a database abstraction model constructed from logical fields that map to data stored in the underlying physical database. Each logical field defines an access method that specifies a location (i.e., a table and column) in the underlying database from which to retrieve data. Users compose an abstract query by selecting logical fields and specifying conditions. The operators available for composing conditions in an abstract query generally include the same operators available in SQL (e.g., comparison operators such as =, >, <, >=, and, <=, and logical operators such as AND, OR, and NOT). Data is retrieved from the physical database by generating a resolved query (e.g., an SQL statement) from the abstract query. Because the database abstraction model is tied to neither the syntax nor the semantics of the physical database, additional capabilities may be provided by the database abstraction model without having to modify the underlying database. Thus, the database abstraction model provides a platform for additional enhancements that allow users to compose meaningful queries easily, without having to disturb existing database installations.

However, even though the database abstraction model can simplify the use of an underlying database, it can nonetheless be very complex, particularly when it includes a large number of logical fields. One approach to simplifying a database abstraction model is the use of model entities, which provide an entity focus for abstract queries. Commonly assigned U.S. Pat. No. 7,054,877 (the '877 patent) entitled "Dealing with Composite Data through Data Model Entities" discloses the use of model entities to provide a focus for abstract queries.

Further, the '877 patent discloses query interfaces configured to enable a user to compose abstract queries from logical fields of the database abstraction model, and to specify a model entity to provide a focus for the composed abstract query. Conventionally, such query interfaces include all logical fields of the database abstraction model, or at least those logical fields that the user has privileges to access. In the case of a complex database abstraction model, the query interface may include a large number of logical fields, including many which are unrelated to the specified model entity. In fact, some logical fields included in the query interface may not be accessible when specifying certain model entities. As a result, a user may compose abstract queries using logical fields that are not relevant to the model entity, such that those queries are incapable of being properly executed.

Accordingly, there is a need for techniques for displaying logical fields that are relevant to a model entity in a query interface.

SUMMARY OF THE INVENTION

The present invention generally provides techniques for displaying relevant abstract database elements in a query interface.

One embodiment of the invention provides a computer-implemented method for identifying logical fields relevant to a model entity, comprising: identifying a selection of a model entity, wherein the model entity specifies a logical focus for the abstract query and wherein the model entity is defined by a database abstraction model as a set of database relations, wherein each relation specifies a first structure and a second structure of a physical database underlying the database abstraction model, and wherein the first structure and the second structure store data related to the model entity; identifying the first database structure and second database structure referenced by each of the one or more relations in the definition of the model entity in the database abstraction model; for each database structure referenced by the one or more relations, identifying one or more logical fields defined by the database abstraction model which reference a respective one of the database structures; and outputting, for display in a query interface, the identified one or more of logical fields relevant to the selected model entity.

Another embodiment of the invention provides a computer-readable storage medium containing a program which, when executed, performs an operation. The operation comprises: identifying a selection of a model entity, wherein the model entity specifies a logical focus for the abstract query and wherein the model entity is defined by a database abstraction model as a set of database relations, wherein each relation specifies a first structure and a second structure of a physical database underlying the database abstraction model, and wherein the first structure and the second structure store data related to the model entity; identifying the first database structure and second database structure referenced by each of the one or more relations in the definition of the model entity in the database abstraction model; for each database structure referenced by the one or more relations, identifying one or more logical fields defined by the database abstraction model which reference a respective one of the database structures; and outputting, for display in a query interface, the identified one or more of logical fields relevant to the selected model entity.

Yet another embodiment of the invention provides a system, comprising: a processor; and a memory containing a program configured to perform an operation. The operation comprises: identifying a selection of a model entity, wherein the model entity specifies a logical focus for the abstract query and wherein the model entity is defined by a database abstraction model as a set of database relations, wherein each relation specifies a first structure and a second structure of a physical database underlying the database abstraction model, and wherein the first structure and the second structure store data related to the model entity; identifying the first database structure and second database structure referenced by each of the one or more relations in the definition of the model entity in the database abstraction model; for each database structure referenced by the one or more relations, identifying one or more logical fields defined by the database abstraction model which reference a respective one of the database structures; and outputting, for display in a query interface, the identified one or more of logical fields relevant to the selected model entity.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention enable users of an abstract database to compose an abstract query using logical fields associated with a given model entity. The model entity may provide a logical focus or subject for an abstract query, and the logical fields may specify attributes of the model entity for which the user is searching. For example, a "hemoglobin test" logical field could be used to compose a query condition to identify instances of the patient model entity with unusual hemoglobin test results. In one embodiment, the user may be presented with a query interface that includes the logical fields that are relevant for a given model entity, and the interface may be used to compose abstract queries using the collection of relevant fields associated with that model entity. For example, a medical researcher may use a query interface to compose an abstract query for a model entity "Patient," where the query interface includes relevant fields that are related to patients (e.g., patient address, patient medical records, patient medical tests, etc.). Exposing the user to the logical fields that are relevant to the model entity may improve the quality and ease of use of the query interface.

Further, in one embodiment, the user may be restricted from including certain logical fields in an abstract query, even though such logical fields are associated with the model entity being queried. For example, logical fields associated with a model entity may be marked as unavailable for queries that rely on database resources (links or tables) in the application marked as unavailable for certain users based on a user profile, or are not present or are under development. As another example, logical fields may be made unavailable when their use in an abstract given query would exceed the system resources from a complexity or performance perspective (or resources allocated to a given user).

In another embodiment, a query interface may include an initial query result, and may include relevant fields for instances of a model entity included in the initial query result. The query interface may be configured to enable a user to perform subsequent query operations using the collection of relevant fields for the given model entity. For example, a medical researcher may use a query interface to execute a query to identify a set of patients that satisfy some set of conditions. After presenting the results of the query, the query interface may also allow the researcher to perform a variety of other tasks. For example, the query interface may be configured to enable the researcher to perform subsequent query operations to retrieve and display additional information related to a particular patient included in the initial query results.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
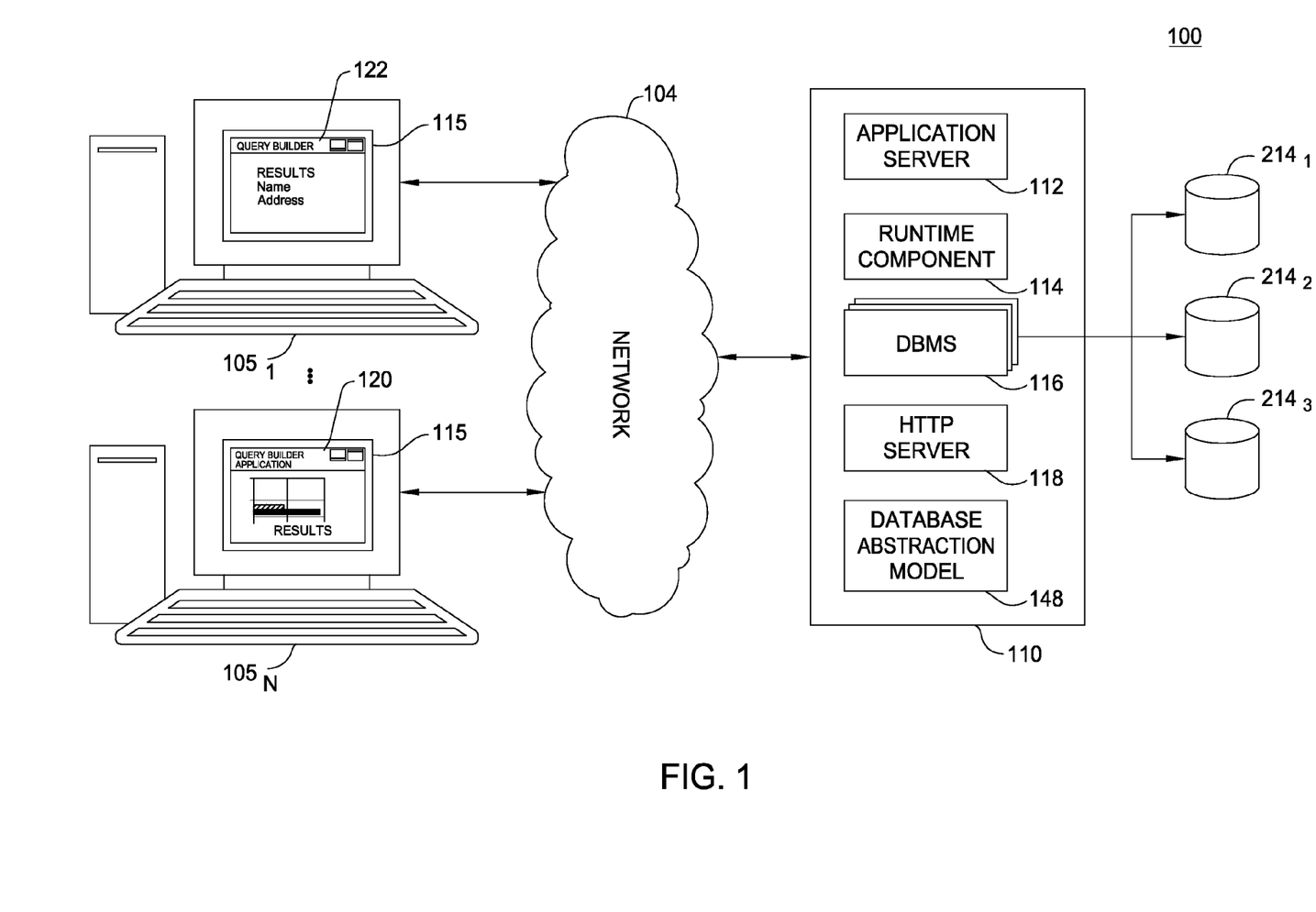
FIG. 1 illustrates a network environment using a client-server configuration, according to one embodiment of the invention.

FIG. 1 illustrates a network environment 100 using a client-server configuration, according to one embodiment of the invention. Client computer systems $105_{1-N}$ include an interface that enables network communications with other systems over network 104. The network 104 may be a local area network where both the client system 105 and server system 110 reside in the same general location, or may be network connections between geographically distributed systems, including network connections over the internet. Client system 105 generally includes a central processing unit (CPU) connected by a bus to memory and storage (not shown). Each client system 105 is typically running an operating system configured to manage interaction between the computer hardware and the higher-level software applications running on the client system 105 (e.g., a Linux® distribution, a version of the Microsoft Windows® operating system IBM's AIX® or OS/400®, FreeBSD, and the like). ("Linux" is a registered trademark of Linus Torvalds in the United States and other countries.)

The server system 110 may include hardware components similar to those used by the client system 105. Accordingly, the server system 110 generally includes a CPU, a memory, and a storage device, coupled by a bus (not shown). The server system 110 is also running an operating system, (e.g., a Linux® distribution, Microsoft Windows®, IBM's OS/400® or AIX®, FreeBSD, and the like).

The network environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, users interact with the server system 110 using a graphical user interface (GUI) provided by a user interface 115. In a particular embodiment, GUI content may comprise HTML documents (i.e., web-pages) rendered on a client computer system $105_1$ using web-browser 122. In such an embodiment, the server system 110 includes a Hypertext Transfer Protocol (HTTP) server 118 (e.g., a web server such as the open source Apache web-server program or IBM's Web Sphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests. Alternatively, client application 120 may comprise a database front-end, or query application program running on client system $105_N$. The web-browser 122 and application 120 may be configured to allow a user to compose an abstract query, and to submit the query to the runtime component 114 for processing.

As illustrated in FIG. 1, server system 110 may further include runtime component 114, database management system (DBMS) 116, and database abstraction model 148. In one embodiment, these components may be provided using software applications executing on the server system 110. The DBMS 116 includes a software application configured to manage databases $214_{1-3}$. That is, the DBMS 116 communicates with the underlying physical database system, and manages the physical database environment behind the database abstraction model 148. Users interact with the user interface 115 to compose and submit an abstract query to the runtime component 114 for processing.

In one embodiment, the runtime component 114 may be configured to receive an abstract query, and in response, to generate a "resolved" or "concrete" query that corresponds to the schema of underlying physical databases 214. For example, the runtime component 114 may be configured to generate one or more Structured Query Language (SQL) statements from an abstract query. The resolved queries generated by the runtime component 114 are supplied to DBMS 116 for execution. Additionally, the runtime component 114 may be configured to modify the resolved query with additional restrictions or conditions, based on the focus of the abstract query, i.e., based on the model entity specified for a given query.

Figure 2A:
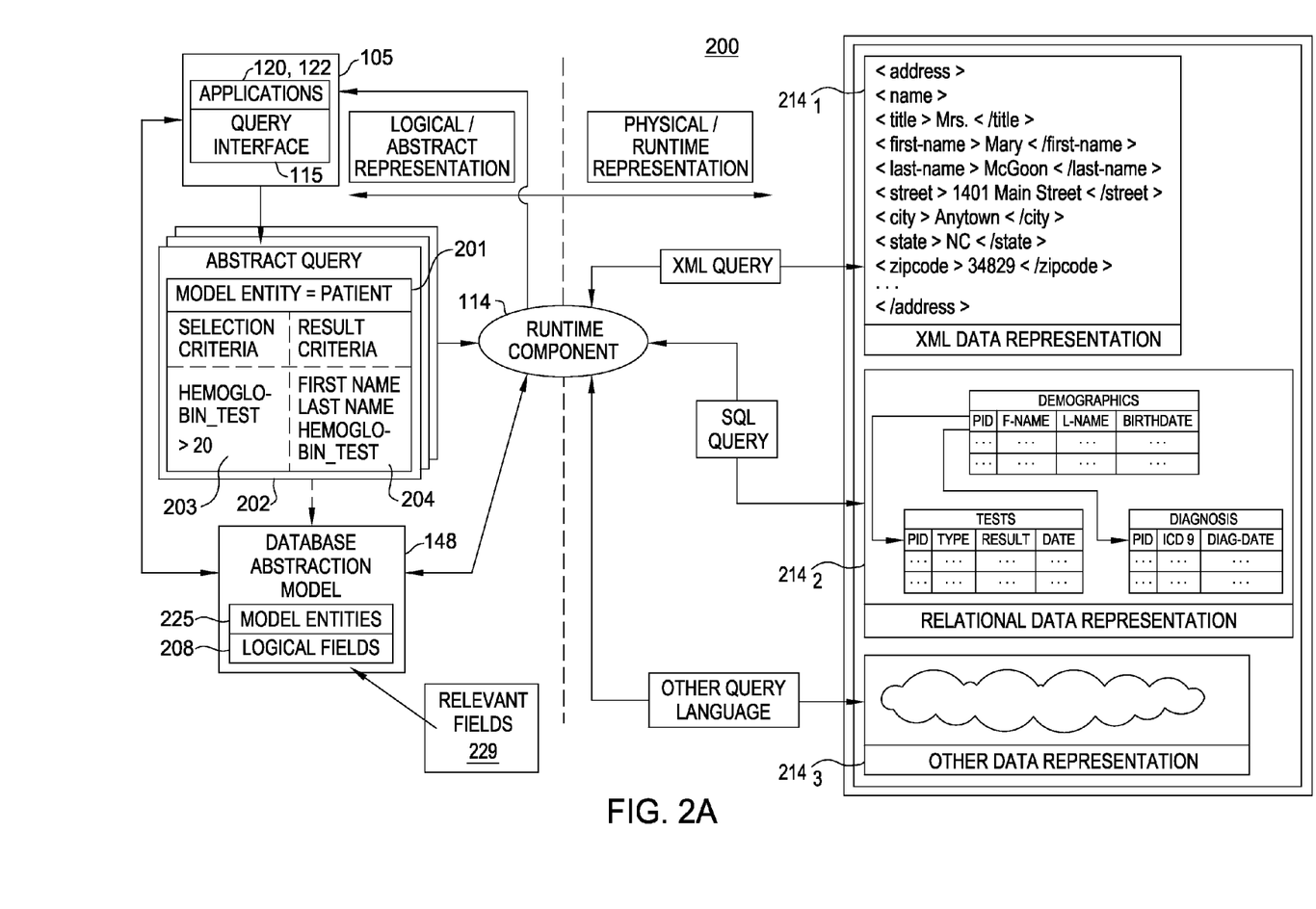
FIGS. 2A-2D illustrate a logical view of a database abstraction model constructed over an underlying physical database, according to one embodiment of the invention.

FIG. 2A illustrates a plurality of interrelated components of the invention, along with relationships between the logical view of data provided by the database abstraction model environment (the left side of FIG. 2A), and the underlying physical database environment used to store the data (the right side of FIG. 2A).

In one embodiment, the database abstraction model 148 provides definitions for a set of logical fields 208, model entities 225, and relevant fields 229. Users compose an abstract query 202 by specifying logical fields 208 to include in selection criteria 203 and results criteria 204. An abstract query 202 may also identify a model entity 201 from the set of model entities 225. The resulting query is generally referred to herein as an "abstract query" because it is composed using logical fields 208 rather than direct references to data structures in the underlying physical databases 214. The model entity 225 may be used to indicate the focus of the abstract query 202 (e.g., a "patient", a "person", an "employee", a "test", a "facility" etc). For example, abstract query 202 includes an indication that the query is directed to instances of the "patient" model entity 201, and further includes selection criteria 203 indicating that patients with a "hemoglobin_test>20" should be retrieved. The selection criteria 203 are composed by specifying a condition evaluated against the data values corresponding to a logical field 208 (in this case the "hemoglobin_test" logical field. The operators in a condition typically include comparison operators such as =, >, <, >=, or, <=, and logical operators such as AND, OR, and NOT. Results criteria 204 indicates that data retrieved for this abstract query 202 includes data for the "name," "age," and "hemoglobin_test" logical fields 208.

As stated, in one embodiment, an abstract query may specify a type of model entity being queried (e.g., a patient, an employee or a test). That is, a model entity defines the focus, or central concept, for an abstract query. Rather than compose a query data based on the structure of an underlying database (e.g., an SQL schema), users compose a query about a model entity (e.g., about a patient) by specifying which logical fields should be used to evaluate whether a given instance of the model entity should be included in the query results. Doing so allows users to compose complex queries in a straightforward and intuitive manner. However, as stated not all logical fields 208 are typically going to be related to each of the model entities 225. Thus, an interface that presents a complete collection of logical fields 208 to a user may become cluttered and confusing, at best, or worse, may allow users to compose an abstract that cannot be resolved into a corresponding physical query. The use of model entities to provide a focus for abstract queries is described in commonly assigned U.S. Pat. No. 7,054,877 (the '877 patent) entitled "Dealing with Composite Data through Data Model Entities."

In one embodiment, relevant fields 229 include each logical field 208 of database abstraction model 148 that is relevant to a given model entity 225. As used herein, "relevant fields" are logical fields 208 that store data related to a given model entity 225 and are available to include in an abstract query 202 directed to that model entity 225. The particular logical fields 208 which are available may include the complete set of "relevant fields" but may also a subset of those logical fields. As stated, for example, logical fields associated with a model entity may be marked as unavailable in a given case due to database resources that are unavailable to the user composing an abstract query based on a user profile. That is, the user may be authorized to compose a query regarding a given model entity, but may not be authorized to access everything about that entity available through the relevant logical fields. Similarly, if database resources are unavailable or under development, logical fields that reference such resources may be marked as unavailable. As another example, logical fields may be made unavailable when their use in an abstract given query would exceed the system resources from a complexity or performance perspective (or resources allocated to a given user).

Thus, in one embodiment, a user of query interface 115 composing an abstract query 202 for a specific model entity 225 may be presented with only the relevant fields 229 that correspond to that model entity 225.

In one embodiment, relevant fields 229 may be generated at a start-up time for a computer system (e.g., server system 110). Alternatively, relevant fields 229 may be generated periodically (e.g., daily, weekly, monthly, etc.) or whenever a change is made to a related part of database abstraction model 148, for example adding/modifying a logical field, adding/modifying a model entity, adding/modifying a relationship, etc.

In another embodiment, relevant fields 229 may be generated when a given user logs in or when the user composes an abstract query directed to a particular model entity. In such a case, the relevant logical fields may be evaluated dynamically based on a user profile, and only the logical field associated with the model entity (and not marked unavailable) are presented in to the user (e.g., as part of query interface 115). Relevant fields 229 may be stored by any suitable technique, for example in a database table, in an XML data file, and the like.

In one embodiment, runtime component 114 retrieves data from physical database 214 by generating a resolved query (e.g., an SQL statement) from abstract query 202. Because database abstraction model 148 is not tied to either the schema of physical database 214 or the syntax of a particular query language, additional capabilities may be provided by database abstraction model 148 without having to modify the underlying database. Further, depending on the access method specified for a logical field, runtime component 114 may transform abstract query 202 into an XML query that queries data from database $214_1$, an SQL query of relational database $214_2$, or other query composed according to another physical storage mechanism using other data representation $214_3$, or combinations thereof (whether currently known or later developed).

Figure 2B:
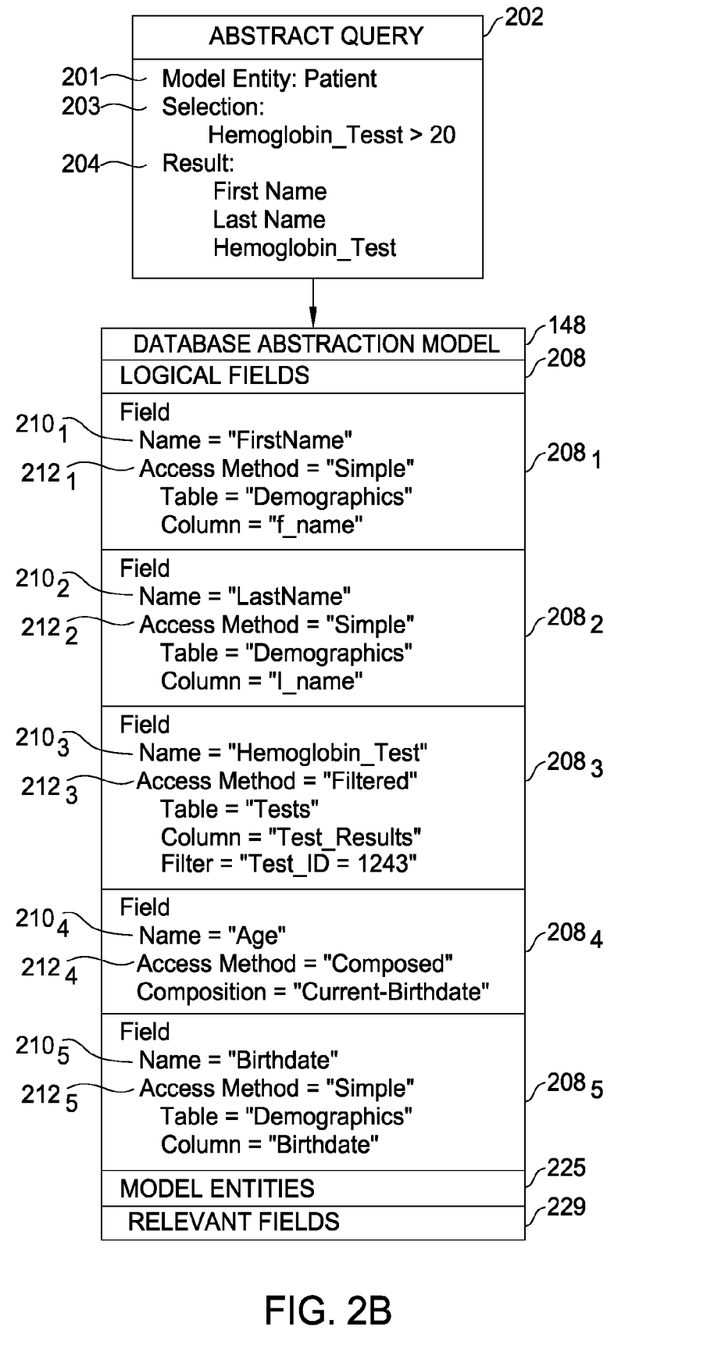
Figure 2C:
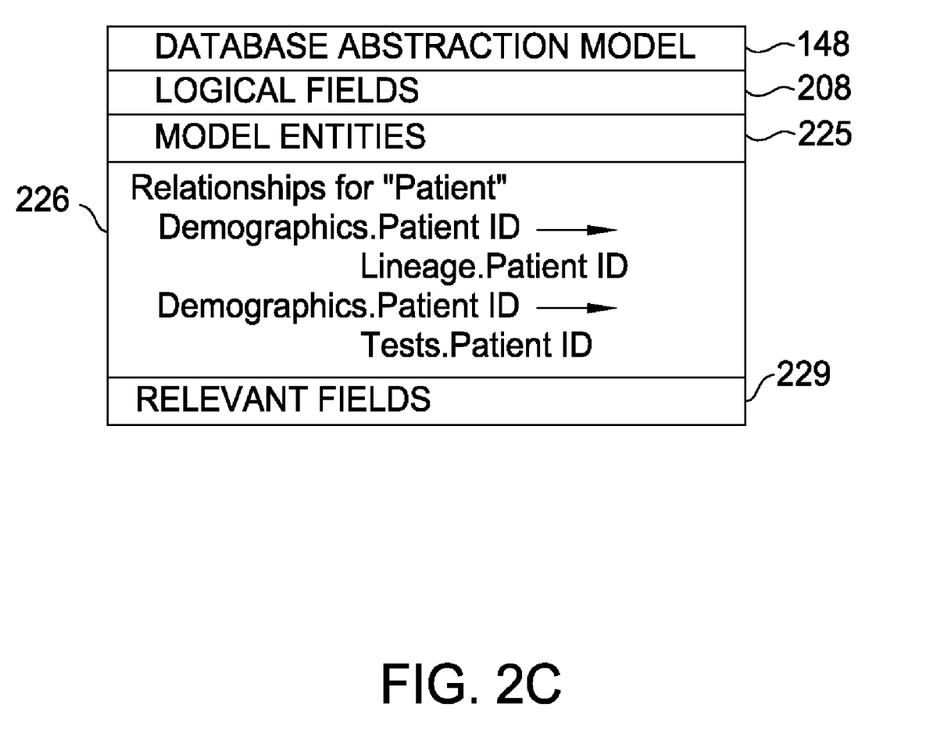
Figure 2D:
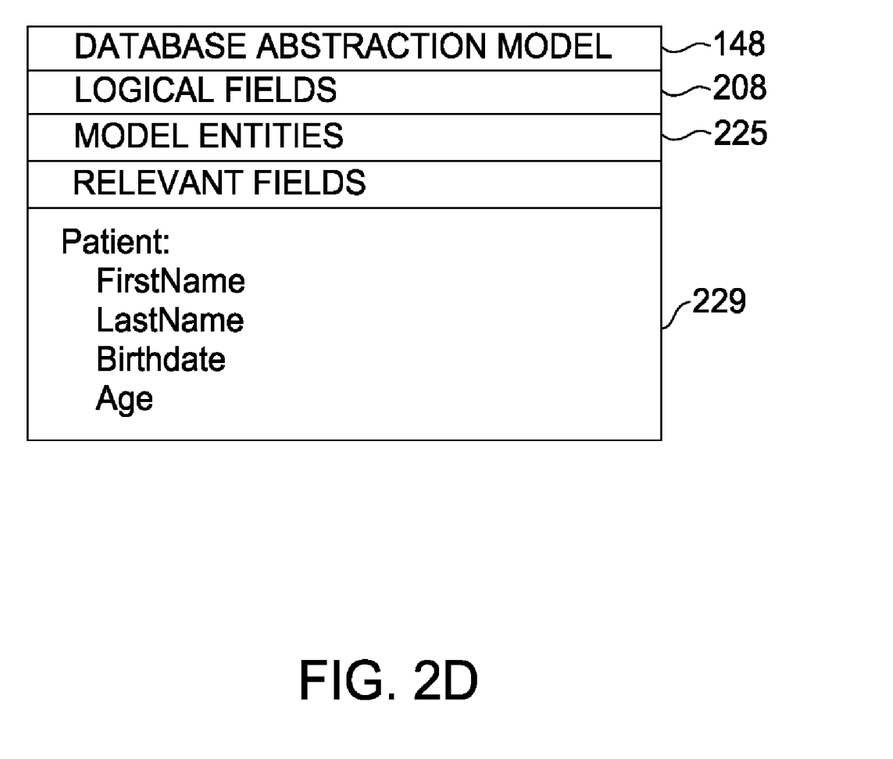

FIGS. 2B-2D illustrate an exemplary abstract query 202, relative to the database abstraction model 148, according to one embodiment of the invention. As shown in FIG. 2B, abstract query 202 includes selection criteria 203 indicating that the query should retrieve instances of the patient model entity 201 with a "hemoglobin" test value greater than "20." The particular information retrieved using abstract query 202 is specified by result criteria 204. In this example, the abstract query 202 retrieves a patient's name and a test result value for a hemoglobin test. The actual data retrieved may include data from multiple tests. That is, the query results may exhibit a one-to-many relationship between a particular model entity and the query results.

An illustrative abstract query corresponding to abstract query 202 is shown in Table I below. In this example, the abstract query 202 is represented using eXtensible Markup Language (XML). In one embodiment, query interface 115 may be configured to enable a user to compose an abstract query, and to generate an XML document to represent the finished abstract query. Those skilled in the art will recognize that XML is a well known markup language used to facilitate the sharing of structured text and information, other markup languages, however, may be used.

TABLE I

Query Example

```
001  <?xml version="1.0"?>
002  <!--Query string representation: ("Hemoglobin_test > 20")
003  <QueryAbstraction>
004    <Selection>
005      <Condition>
006        <Condition field="Hemoglobin Test" operator="GT" value="20"
007      </Condition>
008    </Selection>
009    <Results>
010      <Field name="FirstName"/>
011      <Field name="LastName"/>
012      <Field name="hemoglobin_test"/>
013    </Results>
014    <Entity name="Patient" >
015      <FieldRef name="data://patient/PID" />
016      <Usage type="query" />
017    </EntityField>
018   </Entity>
019  </QueryAbstraction>
```

The XML markup shown in Table I includes the selection criteria 203 (lines 004-008) and the results criteria 204 (lines 009-013). Selection criteria 203 includes a field name (for a logical field), a comparison operator (=, >, <, etc) and a value expression (what the field is being compared to). In one embodiment, the results criteria 204 include a set of logical fields for which data should be returned. The actual data returned is consistent with the selection criteria 203. Lines 14-18 identify the model entity selected by a user, in this example, a "Patient" model entity. Thus, the query results returned for abstract query 202 are instances of the "Patient" model entity. Line 15 indicates the identifier in the physical database 214 used to identify instances of the model entity. In this case, instances of the "Patient" model entity are identified using values from the "Patient ID" column of a patient table.

After composing an abstract query, a user may submit it to runtime component 114 for processing. In one embodiment, runtime component 114 may be configured to process abstract query 202 by generating an intermediate representation of abstract query 202, such as an abstract query plan. In one embodiment, an abstract query plan is composed from a combination of abstract elements from the data abstraction model and physical elements relating to the underlying physical database. For example, an abstract query plan may identify which relational tables and columns are referenced by which logical fields included in abstract query 202, and further identify how to join columns of data together. Runtime component 114 may then parse the intermediate representation in order to generate a physical query of the underlying physical database (e.g., an SQL statement(s)). Abstract query plans and query processing are further described in a commonly assigned, co-pending application entitled "Abstract Query Plan," Ser. No. 11/005,418, filed Dec. 6, 2004.

FIG. 2B further illustrates an embodiment of a database abstraction model 148 that includes a plurality of logical field specifications $208_{1-5}$ (five shown by way of example). The access methods included in logical field specifications 208 (or logical field, for short) are used to map the logical fields 208 to tables and columns in an underlying relational database (e.g., database $214_2$ shown in FIG. 2A). As illustrated, each field specification 208 identifies a logical field name $210_{1-5}$ and an associated access method $212_{1-5}$. Depending upon the different types of logical fields, any number of access methods may be supported by database abstraction model 148. FIG. 2B illustrates access methods for simple fields, filtered fields, and composed fields. Each of these three access methods are described below.

A simple access method specifies a direct mapping to a particular entity in the underlying physical database. Field specifications $208_1$, $208_2$, and $208_5$ each provide a simple access method, $212_1$, $212_2$, and $212_5$, respectively. For a relational database, the simple access method maps a logical field to a specific database table and column. For example, the simple field access method $212_1$ shown in FIG. 2B maps the logical field name $210_1$ "FirstName" to a column named "f_name" in a table named "Demographics."

Logical field specification $208_3$ exemplifies a filtered field access method $212_3$. Filtered access methods identify an associated physical database and provide rules defining a particular subset of items within the underlying database that should be returned for the filtered field. Consider, for example, a relational table storing test results for a plurality of different medical tests. Logical fields corresponding to each different test may be defined, and a filter for each different test is used to associate a specific test with a logical field. For example, logical field $208_3$ illustrates a hypothetical "Hemoglobin Test." The access method for this filtered field $212_3$ maps to the "Test_Result" column of a "Tests" tests table and defines a filter "Test_ID='1243.'" Only data that satisfies the filter is returned for this logical field. Accordingly, the filtered field $208_3$ returns a subset of data from a larger set, without the user having to know the specifics of how the data is represented in the underlying physical database, or having to specify the selection criteria as part of the query building process.

Field specification $208_4$ exemplifies a composed access method $212_4$. Composed access methods generate a return value by retrieving data from the underlying physical database and performing operations on the data. In this way, information that does not directly exist in the underlying data representation may be computed and provided to a requesting entity. For example, logical field access method $212_4$ illustrates a composed access method that maps the logical field "age" $208_4$ to another logical field $208_5$ named "birthdate." In turn, the logical field "birthdate" $208_5$ maps to a column in a demographics table of relational database $214_2$. In this example, data for the "age" logical field $208_4$ is computed by retrieving data from the underlying database using the "birthdate" logical field $208_5$, and subtracting a current date value from the birth date value to calculate an age value returned for the logical field $208_4$. Another example includes a "name" logical filed (not shown) composed from the first name and last name logical fields $208_1$ and $208_2$.

By way of example, the field specifications 208 shown in FIG. 2B are representative of logical fields mapped to data represented in the relational data representation $214_2$. However, other instances of database abstraction model 148 or, other logical field specifications, may map to other physical data representations (e.g., databases $214_1$ or $214_3$ illustrated in FIG. 2A). Further, in one embodiment, database abstraction model 148 is stored on computer system 110 using an XML document that describes the model entities, logical fields, access methods, and additional metadata that, collectively, define the database abstraction model for a particular physical database system. Other storage mechanisms or markup languages, however, are also contemplated.

Referring to FIG. 2C, database abstraction model 148 also includes model entities 225. Illustratively, only a single model entity 225 is shown, for the model entity "Patient." As shown, model entity 225 includes a set of relationships 226 which identify data available in database 214 that is related to instances of the "Patient" model entity. For example, the first model entity relationship 226 indicates that data from a "Demographics" table and a "Lineage" table are linked by columns named "Patient ID." Further, the second model entity relationship 226 indicates that data from the "Demographics" table and a "Tests" table are linked by columns named "Patient ID." Collectively, relationships 226 define the "universe" of data about the model entity 225 stored in the underlying physical database 214. That is, relationships 226 specify what physical tables and fields are accessible for a given model entity 225.

Referring to FIG. 2D, database abstraction model 148 also includes relevant fields 229. As shown, relevant fields 229 correspond to the "Patient" model entity 225, and include the logical fields "FirstName," "LastName," "Birthdate" and "Age." As described above, relevant fields 229 may identify the logical fields 208 of database abstraction model 148 that are relevant to a given model entity 225. In one embodiment, relevant fields 229 may be generated from relationships 226 and logical fields 208, as described below with reference to FIG. 3.

Figure 3:
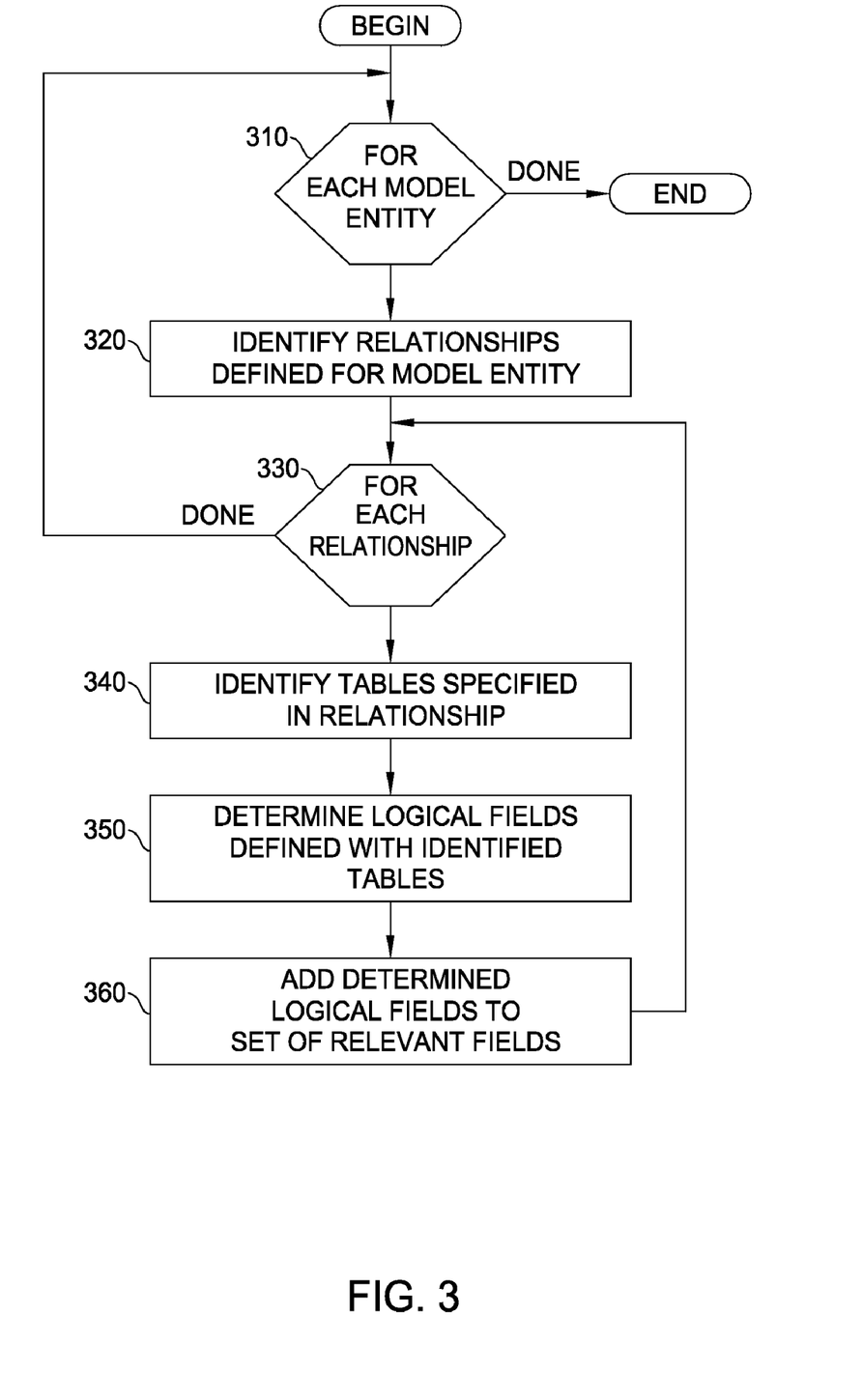
FIG. 3 is a flow diagram illustrating a method for determining logical fields that are relevant to model entities of a data abstraction model, according to one embodiment of the invention.

FIG. 3 is a flow diagram illustrating a method 300 for determining logical fields that are relevant to model entities of a database abstraction model (DAM), according to one embodiment of the invention. The method 300 begins at step 310, by entering a loop (defined by steps 320, 330, 340, 350, and 360) for processing each model entity of the DAM. For example, model entity 225 of data abstraction model 148, as illustrated in FIG. 1. At step 320, the relationships specified for a model entity are identified. In one embodiment, each relationship defines a link between two physical tables, where the link is provided by a column (or combination of columns) of each table that store the related values. For example, such relationships may be configured similarly to relationships 226 illustrated in FIG. 2C, which include a relationship of the "Patient ID" field of the "Demographics" table to the "Patient ID" field of the "Lineage" table, and a relationship of the "Patient ID" field of the "Demographics" table to the "Patient ID" field of the "Tests" table.

At step 330, the method 300 enters a loop (defined by steps 340, 350, and 360) for processing each relationship specified for a particular model entity. At step 340, the tables specified in a given model entity relationship are identified. For example, assume that the first relationship 226 of the "Patient" model entity (illustrated in FIG. 2C) is being processed. Since the "Demographics" table is included in the first relationship 226, the "Demographics" table would be identified at step 340. At step 350, it is determined which logical fields of the DAM are defined to access or depend on the tables identified at step 340. For the present example, assume the DAM includes logical fields $208_{1-5}$ illustrated in FIG. 2B, and that the "Demographics" table is identified at step 340. In this case, logical fields "FirstName" $208_1$, "LastName" $208_2$, and "Birthdate" $208_5$ each accesses data from the "f_name", "l_name", and "Birthdate" columns of the "Demographics" table. Further, logical field "Age" $208_4$ is a "composed" logical field which depends on the current system date (i.e., "Currentdate") and data from the "Birthdate" column of the "Demographics" table. Thus, at step 350, the logical fields $208_1$, $208_2$, $208_4$, $208_5$ would be determined at step 350.

At step 360, the logical fields determined in step 350 are added to a set of relevant fields for the model entity currently being processed. For example, continuing the above example, the "FirstName," "LastName," "Birthdate" and "Age" logical fields may be added to relevant fields 229. In one embodiment, the relevant fields may be stored as a database table. In another embodiment, the relevant fields may be generated dynamically by performing the method 300 as required (i.e., "on the fly"). In other embodiments, the relevant fields may be stored in volatile memory (e.g., system random-access memory), or by any other suitable approach.

Once the relationships specified for a model entity are completed at step 330, the method 300 continues at step 310, where a new model entity is processed. Once all model entities of the DAM are processed at step 310, the method 300 ends. In one embodiment, the method 300 may be performed at start-up of a computer system hosting the DAM (e.g., server system 100 illustrated in FIG. 1). Once generated, the relevant fields table may remain available until the computer system is shut down. In other embodiments of the invention, the method 300 may be performed periodically (e.g., once a week), or whenever a change to the DAM takes place (e.g., a new model entity is defined, or an existing model entity is modified).

Figure 4A:
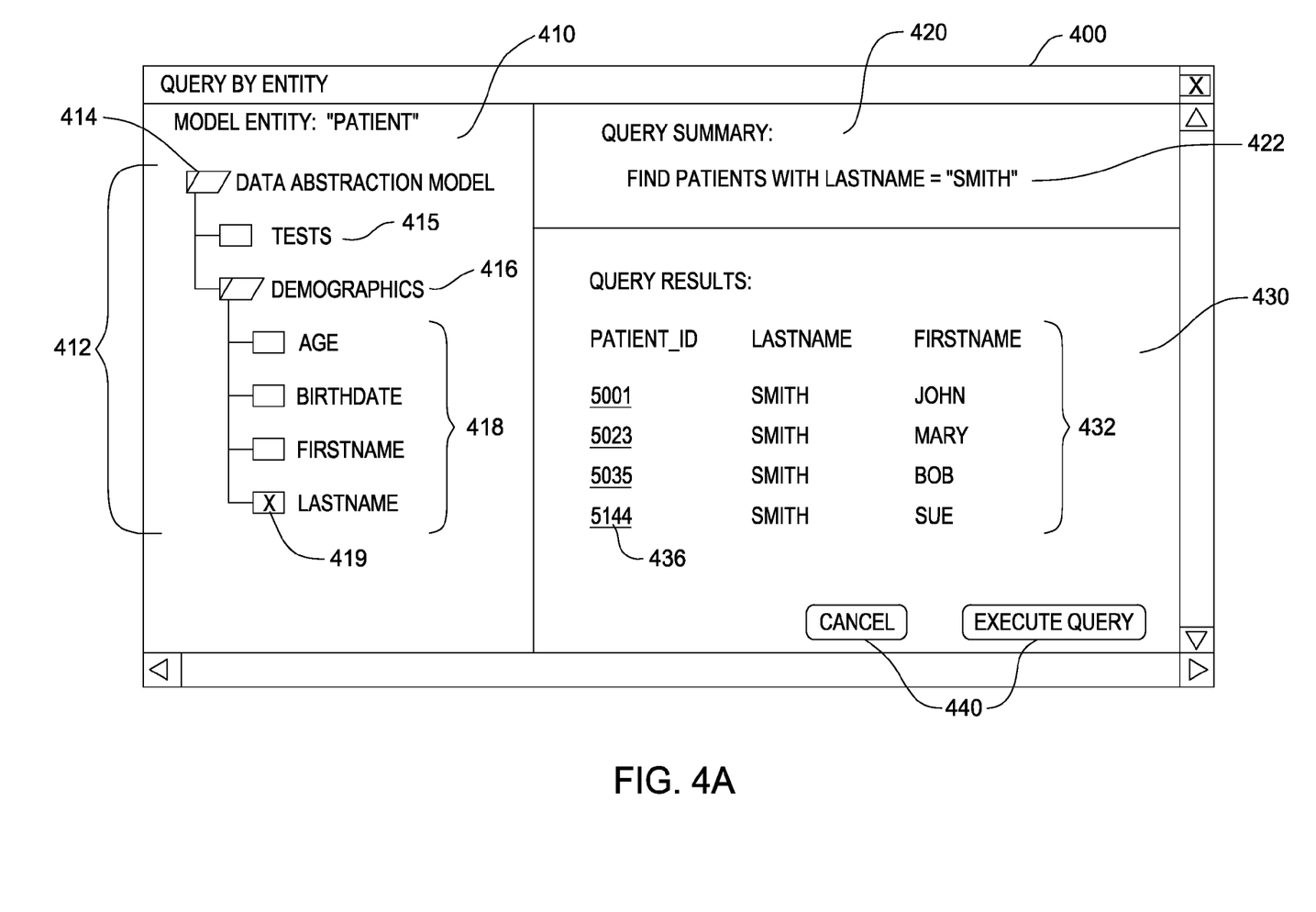
FIGS. 4A-4B illustrate a query interface configured to use relevant fields of a model entity for composing an abstract query, according to one embodiment of the invention.
Figure 4B:
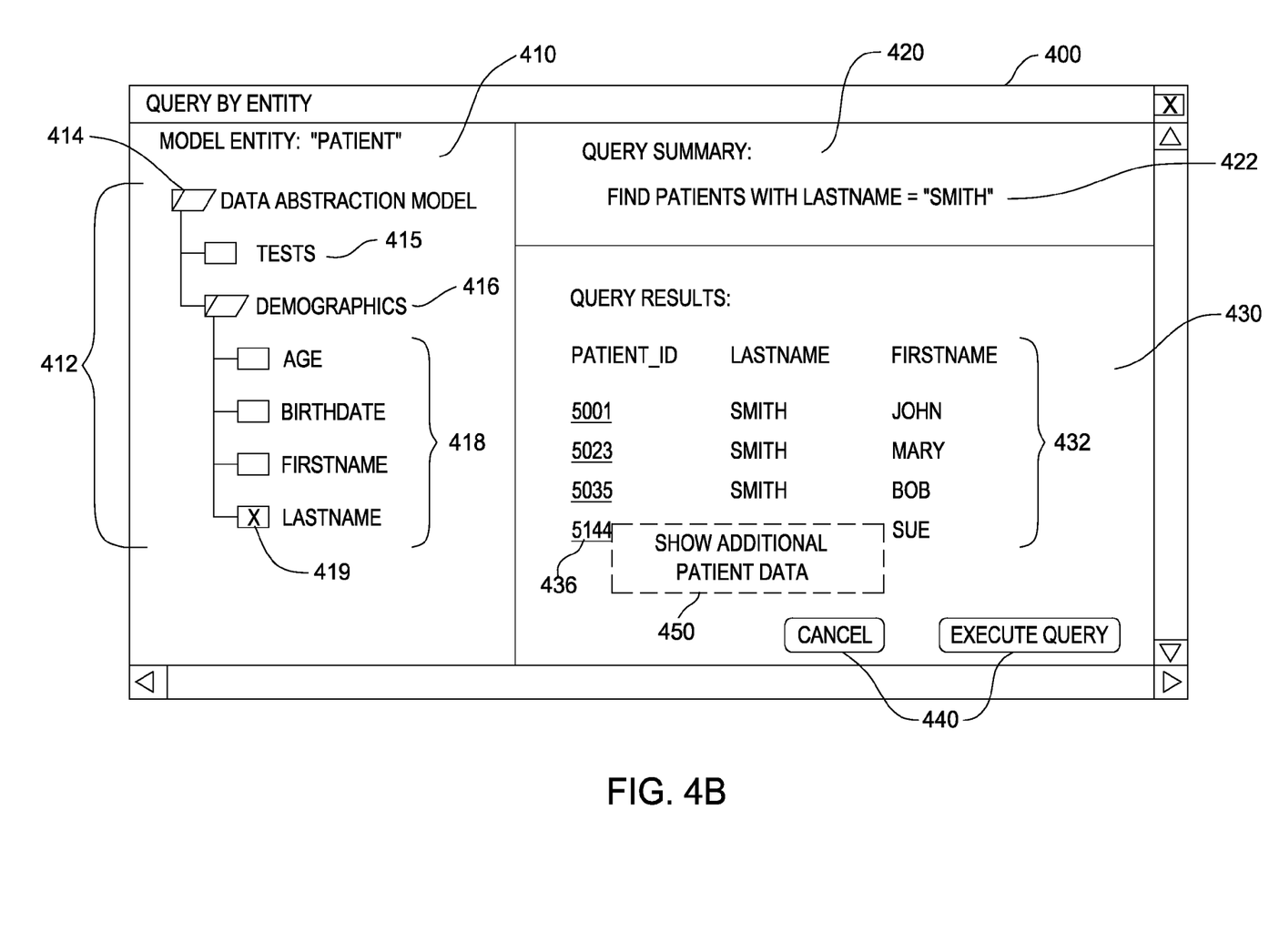

As described above, embodiments of the invention provide a query interface 115 for use in composing an abstract query 202. FIGS. 4A-4B illustrate an example of a query interface 400 configured to use relevant logical fields of a model entity for composing an abstract query, according to one embodiment of the invention. As shown, query interface 400 includes a DAM navigator section 410, a query summary section 420, a query results section 430 and control buttons 440. DAM navigator section 410 indicates that the query interface 400 is being used to compose a query for the "PATIENT" model entity. DAM navigator section 410 includes a folder tree 412 to provide a graphical representation of the DAM for the "PATIENT" model entity, and which can be used to navigate through the categories and fields which make up the DAM.

In one embodiment, the query interface may be configured to display only the relevant fields for a given model entity. For example, folder tree 412 may be configured to display only the relevant fields 229 determined by method 300. In another embodiment, a query interface may be configured to display all fields of a DAM, but to limit a user to the relevant fields of a given model entity for use in composing a query. For example, folder tree 412 may display all logical fields of DAM 148, but with relevant fields 229 being accessible to the user. That is, logical fields other than the relevant fields (i.e. "non-relevant fields") may be displayed, but may not be used for composing a query. The non-relevant fields may be shown with a visual style indicating that they are not available to the user (e.g., displaying the field as grayed-out, with a strike-through line, etc.).

In one embodiment, in addition to restricting the fields displayed to the user by relevance to a model entity, the set of relevant logical fields may also be filtered for other reasons. For example, relevant fields 229 may be filtered by access privileges of the user specified in a user profile. That is, a user may have access to logical fields restricted on the basis of the user's security privileges. For example, a medical researcher using query interface 400 may have user access to patient medical data, but may not have user access to patient financial information (e.g., credit card number, payments history, etc.) due to security policies applied to the database. In this example, the medical researcher is unable to access financial data fields in query interface 400, even though those fields may be included in relevant fields 229 for the "Patient" model entity.

In the example illustrated in FIG. 4A, a user of query interface 400 has selected a "DATA ABSTRACTION MODEL" folder 414 to drill down into the DAM. As a result, folder tree 412 expands to display a "TESTS" folder 415 and a "DEMOGRAPHICS" folder 416, representing categories of the DAM. The user has selected "DEMOGRAPHICS" folder 416, and in response the folders 418 are displayed, with each folder 418 representing a logical field within the "DEMOGRAPHICS" category. Finally, the user has selected a "LASTNAME" folder 419, indicating a logical field to be used for composing an abstract query.

In this example, the user has composed the query 422 illustrated in query summary section 420, namely a query for any patients having the last name "SMITH." Illustratively, query results display section 430 displays a set of query results 432 including data for patients having the last name "SMITH."

Returning to FIG. 4A, note that query results 432 include a "PATIENT_ID" column 434, which presents identification values for each patient. As illustrated, each "PATIENT_ID" value is underlined, indicating a hyperlink to other data. In one embodiment, query results may be displayed using a text hyperlink that links to additional data about each individual "patient" model entity. For example, the initial query results may display the requested data, and additional information about a model entity may be accessed through the hyperlink. Thus, by clicking on hyperlink 436 for patient "5144," the user may request additional data available about this instance of the "patient" model entity.

In one embodiment, a request for additional data may result in additional options being presented to the user. For example, FIG. 4B illustrates a pop-up menu 450 displayed in response to the user selection of hyperlink 436. As shown, pop-up menu 450 enables the user to retrieve additional data related to a particular model entity, namely the patient "5144." In one embodiment, the additional data (not shown) may be limited to relevant fields 229 for the "Patient" model entity. Of course, query interface 400 is provided for illustrative purposes only, and should not be construed to be limiting of the invention. More generally, any suitable interface may be used.

Figure 5:
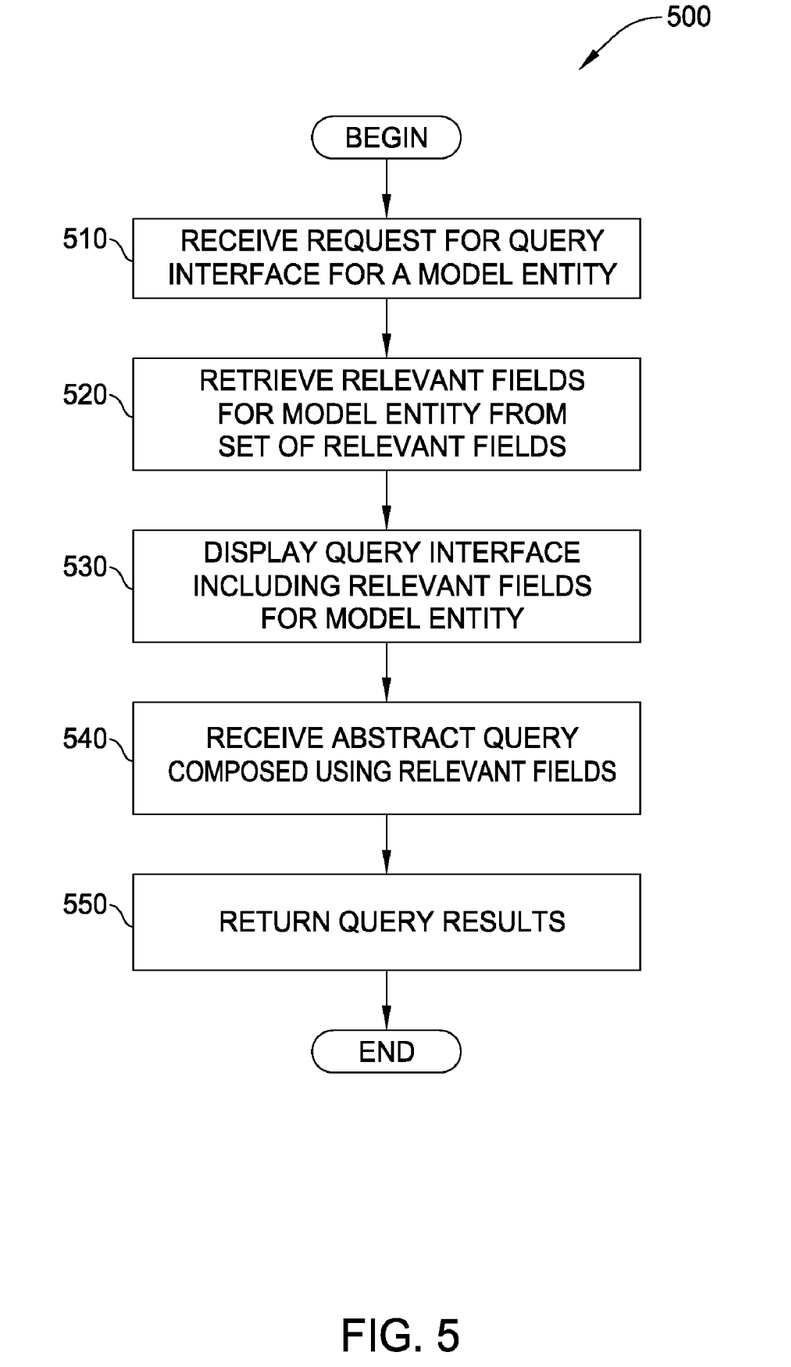
FIG. 5 is a flow diagram illustrating a method for determining logical fields that are relevant to model entities of a database abstraction model, according to one embodiment of the invention

FIG. 5 is a flow diagram illustrating a method 500 for generating a query interface including relevant fields of a model entity, according to one embodiment of the invention. The method 500 begins at step 510, by receiving a request to display a query interface for composing queries for a given model entity. For example, an interface may be generated like query interface 400 illustrated in FIG. 4 used to compose a query for the "Patient" model entity. At step 520, the relevant fields of the model entity are retrieved from a set of relevant fields (e.g., relevant fields 229 illustrated in FIGS. 2A-2D). As described, the relevant logical fields may include logical fields of the data abstraction model determined to be related to a given model entity. The set of relevant fields may have been generated in advance by method 300 described above or may be determined in response to the request received at step 510. Further, as described, the relevant logical fields may also be filtered for other reasons associated with a user profile, database access or connectivity, etc.

At step 530, the query interface generated at step 520 is displayed to the user. In one embodiment, the relevant fields may be displayed in a graphical representation of the data abstraction model, e.g., displayed using folder tree 412 shown in FIG. 4A. At step 540, a user may interact with the query interface generated at step 530 to compose an abstract query using one or more of the relevant logical fields. For example, referring again to FIG. 4A, the user may interact with folder tree 412 to compose the query 422. At step 550, the query results are displayed in the query interface. For example, query results 432 displayed in query interface 400, as illustrated in FIG. 4A. The query results may be generated, for example, when runtime component 114 retrieves data from the physical database 214 by generating a resolved query (e.g., an SQL statement) from the abstract query 422.

Once step 550 is completed, method 500 ends. In one embodiment, the query interface may be configured to enable a user to perform subsequent query operations based on an initial set of query results. For example, pop-up menu 450 included in query interface 400, as illustrated in FIG. 4B. In such embodiments, method 500 may be repeated for any subsequent query operations using relevant fields for a model entity.

Advantageously, embodiments of the invention enable users of an abstract database to use logical fields that are related to a given model entity. Conventional query interfaces configured for composing abstract queries may include all logical fields of a database abstraction model. In the case of a complex database abstraction model, the query interface may include a large number of logical fields, including many which are unrelated to the specified model entity. In fact, some logical fields included in the query interface may not be accessible when specifying certain model entities, resulting in queries that are incapable of being properly executed. By limiting the logical fields displayed in a query interface to those that are related to a given model entity, embodiments of the invention enable users to efficiently compose queries that are relevant to the model entity, and which may be properly executed.

While the foregoing is directed to embodiments of the present invention, other and further embodiments of the invention may be devised without departing from the basic scope thereof, and the scope thereof is determined by the claims that follow.

What is claimed is:

1. A computer-implemented method for displaying a collection of logical fields used to compose an abstract query, comprising:

identifying a selection of a model entity by use of one or more computer processors, wherein the model entity specifies a logical focus for the abstract query and wherein the model entity is defined by a database abstraction model as a set of database relations, wherein each relation specifies a first database structure and a second database structure of a physical database underlying the database abstraction model, and wherein the first database structure and the second database structure store data related to the model entity;

identifying the first database structure and second database structure referenced by each of the one or more relations in the definition of the model entity in the database abstraction model;

for each database structure referenced by the one or more relations, identifying one or more logical fields defined by the database abstraction model which reference a respective one of the database structures; and outputting, for display in a query interface, the identified one or more of logical fields relevant to the selected model entity.

2. The computer-implemented method of claim 1, wherein the first database structure and the second database structure of the underlying database comprise, respectively, a first database table and a second database table of a relational database.

3. The computer-implemented method of claim 2, wherein each relation specifies at least a column of the first table and a corresponding column of the second table used to join records from the first and second database tables.

4. The computer-implemented method of claim 1, further comprising, prior to displaying, to the user in the query interface display, the identified one or more of logical fields, removing at least one logical field from the identified logical fields, based on a user profile associated with the user.

5. The computer-implemented method of claim 1, further comprising:
receiving, from the query interface, a request to execute an abstract query composed from the identified logical fields;
executing the requested abstract query;
returning a set of query results to the query interface; and
displaying the set of query results to the user.

6. The computer-implemented method of claim 1, wherein the step of identifying one or more logical fields is performed when the database abstraction model is initialized for use.

7. The computer-implemented method of claim 1, wherein the step of identifying one or more logical fields is performed each time the query interface is displayed for a given model entity.

8. A computer-readable storage medium containing a program which, when executed, performs an operation, comprising:
identifying a selection of a model entity, wherein the model entity specifies a logical focus for the abstract query and wherein the model entity is defined by a database abstraction model as a set of database relations, wherein each relation specifies a first database structure and a second database structure of a physical database underlying the database abstraction model, and wherein the first database structure and the second database structure store data related to the model entity;
identifying the first database structure and second database structure referenced by each of the one or more relations in the definition of the model entity in the database abstraction model;
for each database structure referenced by the one or more relations, identifying one or more logical fields defined by the database abstraction model which reference a respective one of the database structures; and
outputting, for display in a query interface, the identified one or more of logical fields relevant to the selected model entity.

9. The computer-readable storage medium of claim 8, wherein the first database structure and the second database structure of the underlying database comprise, respectively, a first database table and a second database table of a relational database.

10. The computer-readable storage medium of claim 9, wherein each relation specifies at least a column of the first table and a correspodning column of the second table used to join records from the first and second database tables.

11. The computer-readable storage medium of claim 8, further comprising, prior to displaying, to the user in the query interface display, the identified one or more of logical fields, removing at least one logical field, from the identified logical fields, based on a user profile with the user.

12. The computer-readable storage medium of claim 8, wherein the operation further comprises:
receiving, from the query interface, a request to execute an abstract query composed from the identified logical fields;
executing the requested abstract query;
returning a set of query results to the query interface; and
displaying the set of query results to the user.

13. The computer-readable storage medium of claim 8, wherein the operation of identifying one or more logical fields is performed when the database abstraction model is initialized for use.

14. The computer-readable storage medium 8, wherein the operation of identifying one or more logical fields is performed each time the query interface is displayed for a given model entity.

15. A system, comprising:
a processor; and
a memory containing a program configured to perform an operation, comprising:
identifying a selection of a model entity, wherein the model entity specifies a logical focus for the abstract query and wherein the model entity is defined by a database abstraction model as a set of database relations, wherein each relation specifies a first database structure and a second database structure of a physical database underlying the database abstraction model, and wherein the first database structure and the second database structure store data related to the model entity;
identifying the first database structure and second database structure referenced by each of the one or more relations in the definition of the model entity in the database abstraction model;
for each database structure referenced by the one or more relations, identifying one or more logical fields defined by the database abstraction model which reference a respective one of the database structures; and
outputting, for display in a query interface, the identified one or more of logical fields relevant to the selected model entity.

16. The system of claim 15, wherein the first database structure and the second database structure of the underlying database comprise, respectively, a first database table and a second database table of a relational database.

17. The system of claim 16, wherein each relation specifies at least a column of the first table and a correspodning column of the second table used to join records from the first and second database tables.

18. The system of claim 15, further comprising, prior to displaying, to the user in the query interface display, the identified one or more of logical fields, removing at least one logical field, from the identified logical fields, based on an user profile associated with the user.

19. The system of claim 15, wherein the operation further comprises:
receiving, from the query interface, a request to execute an abstract query composed from the identified logical fields;
executing the requested abstract query;
returning a set of query results to the query interface; and
displaying the set of query results to the user.

20. The system of claim 15, wherein the step of identifying one or more logical fields is performed when the database abstraction model is initialized for use.

21. The system of claim 15, wherein the step of identifying one or more logical fields is performed each time the query interface is displayed for a given model entity.

* * * * *